United States Patent
Kwon et al.

(10) Patent No.: US 9,590,265 B2
(45) Date of Patent: *Mar. 7, 2017

(54) CABLE-TYPE SECONDARY BATTERY

(71) Applicant: LG Chem, Ltd., Seoul (KR)

(72) Inventors: Yo-Han Kwon, Daejeon (KR);
Byung-Hun Oh, Daejeon (KR);
Je-Young Kim, Daejeon (KR);
Heon-Cheol Shin, Busan (KR)

(73) Assignee: LG Chem, Ltd. (KR)

( * ) Notice: Subject to any disclaimer, the term of this patent is extended or adjusted under 35 U.S.C. 154(b) by 71 days.

This patent is subject to a terminal disclaimer.

(21) Appl. No.: 14/207,951

(22) Filed: Mar. 13, 2014

(65) Prior Publication Data
US 2014/0193681 A1 Jul. 10, 2014

Related U.S. Application Data (63) Continuation of application No. PCT/KR2012/008402, filed on Oct. 15, 2012.

(30) Foreign Application Priority Data

Oct. 14, 2011 (KR) .................. 10-2011-0105218
Oct. 14, 2011 (KR) .................. 10-2011-0105219
Oct. 15, 2012 (KR) .................. 10-2012-0114438

(51) Int. Cl.
*H01M 4/75* (2006.01)
*H01M 10/04* (2006.01)
(Continued)

(52) U.S. Cl.
CPC ......... *H01M 10/0422* (2013.01); *H01M 4/70* (2013.01); *H01M 4/75* (2013.01);
(Continued)

(58) Field of Classification Search
CPC ......... H01M 10/0422; H01M 10/0565; H01M 2/1653; H01M 4/75; H01M 10/04;
(Continued)

(56) References Cited

U.S. PATENT DOCUMENTS 5,750,286 A 5/1998 Paulot et al.
5,795,680 A * 8/1998 Ikeda et al. .................. 429/245
(Continued)

FOREIGN PATENT DOCUMENTS

CN 1328349 A 12/2001
EP 0331342 A2 9/1989
(Continued)

OTHER PUBLICATIONS

Machine translation of JP 2008-047398, retrieved from <https://www.j-platpat.inpit.go.jp/web/all/top/BTmTopEnglishPage> May 22, 2015.*

(Continued)

*Primary Examiner* — Cynthia K Walls
(74) *Attorney, Agent, or Firm* — Lerner, David, Littenberg, Krumholz & Mentlik, LLP (57) ABSTRACT

The present invention relates to a cable-type secondary battery having a horizontal cross section of a predetermined shape and extending longitudinally, comprising: an inner electrode having an inner current collector and an inner electrode active material layer surrounding the outer surface of the inner current collector; a separation layer surrounding the outer surface of the inner electrode to prevent a short circuit between electrodes; and an outer electrode surrounding the outer surface of the separation layer and having an outer electrode active material layer and an open-structured outer current collector.

18 Claims, 2 Drawing Sheets

(51) Int. Cl.
| | | |
|---|---|---|
| H01M 4/70 | (2006.01) | |
| H01M 10/052 | (2010.01) | |
| H01M 10/058 | (2010.01) | |
| H01M 6/44 | (2006.01) | |
| H01M 4/66 | (2006.01) | |
| H01M 4/02 | (2006.01) | |

(52) U.S. Cl.
CPC ........... *H01M 6/44* (2013.01); *H01M 10/052* (2013.01); *H01M 10/058* (2013.01); *H01M 4/66* (2013.01); *H01M 10/04* (2013.01); *H01M 2004/025* (2013.01); *H01M 2220/20* (2013.01); *Y02E 60/122* (2013.01); *Y02P 70/54* (2015.11); *Y02T 10/7011* (2013.01)

(58) Field of Classification Search
CPC .... H01M 10/052; H01M 10/058; H01M 6/44; H01M 4/70; H01M 2220/20; H01M 2004/025; H01M 4/66; Y02E 60/122; Y02T 10/7011
See application file for complete search history.

(56) References Cited

U.S. PATENT DOCUMENTS

| | | | |
|---|---|---|---|
| 6,054,233 A | 4/2000 | Vourlis | |
| 6,165,645 A | 12/2000 | Nishimura et al. | |
| 6,503,661 B1 | 1/2003 | Park et al. | |
| 2001/0038938 A1 | 11/2001 | Takahashi et al. | |
| 2004/0062958 A1 | 4/2004 | Facchi et al. | |
| 2006/0215106 A1 | 9/2006 | Kang et al. | |
| 2007/0037058 A1 | 2/2007 | Visco et al. | |
| 2007/0243456 A1 | 10/2007 | Ahn et al. | |
| 2008/0050657 A1 | 2/2008 | Nishida et al. | |
| 2009/0035657 A1 | 2/2009 | Buiel et al. | |
| 2009/0130511 A1 | 5/2009 | Eshraghi et al. | |
| 2010/0203372 A1* | 8/2010 | Kim et al. | 429/94 |
| 2010/0285356 A1 | 11/2010 | Choi et al. | |
| 2011/0262809 A1* | 10/2011 | Kumagai et al. | 429/211 |
| 2012/0009331 A1 | 1/2012 | Kwon et al. | |
| 2012/0015233 A1 | 1/2012 | Kwon et al. | |
| 2012/0058376 A1 | 3/2012 | Kwon et al. | |
| 2014/0030569 A1 | 1/2014 | Kwon et al. | |

FOREIGN PATENT DOCUMENTS

| | | | | |
|---|---|---|---|---|
| EP | 0454419 | A2 | 10/1991 | |
| EP | 0532312 | A1 | 3/1993 | |
| EP | 2367228 | A1 | 9/2011 | |
| JP | 63121265 | | 5/1988 | |
| JP | 09-007629 | A | 1/1997 | |
| JP | 2001-110445 | A | 4/2001 | |
| JP | 2005011556 | A | 1/2005 | |
| JP | 2008-537601 | A | 9/2008 | |
| JP | 2010218986 | A | 9/2010 | |
| KR | 2003-0081499 | | 10/2003 | |
| KR | 20050099903 | A | 10/2005 | |
| KR | 100742739 | B1 | 7/2007 | |
| KR | 100804411 | B1 | 2/2008 | |
| KR | 20090009598 | A | 1/2009 | |
| KR | 2010-0098227 | A | 9/2010 | |
| KR | 2010-0121387 | A | 11/2010 | |
| KR | 20110054557 | A | 5/2011 | |
| KR | 2011-0087880 | | 8/2011 | |
| KR | 20110090768 | A | 8/2011 | |
| WO | 2005098994 | A1 | 10/2005 | |
| WO | 2006/077192 | A1 | 7/2006 | |
| WO | WO 2010/052950 | * | 5/2010 | H01M 4/36 |
| WO | 2011093661 | A2 | 8/2011 | |
| WO | 2012124960 | A2 | 9/2012 | |

OTHER PUBLICATIONS

Mesh. (2011). In the Editors of the American Heritage Dictionaries & TheEditorsoftheAmericanHeritageDictionaries (Eds.), The American Heritage Dictionary of the English language. Boston, MA: Houghton Mifflin. Retrieved from http://search.credoreference.com/content/entry/hmdictenglang/mesh/0, retrieved on May 7, 2016.*
Supplemental Search Report from European Appln. No. 12 84 0550, dated Mar. 27, 2015.
International Search Report for Application No. PCT/KR2012/008402 dated Feb. 28, 2013.
International Search Report for Application No. PCT/KR2012/009205 dated Mar. 28, 2013.
Jong-Hee Kim et al., "Degradation of cathode current-collecting materials for anode-supported flat-tube solid oxide fuel cell." Journal of Power Sources, vol. 188 (2009), No. 2, pp. 447-452, Available online on Dec. 24, 2008.
Machine translation of JP 63-121265, retrieved from <http://search.proquest.com/professional/japanpatentsft/patents/fromBasicHomePage?accountid=161361> on Mar. 24, 2015.
Supplemental search report for European Application No. EP 12 84 6759, dated Feb. 27, 2015.

* cited by examiner

CABLE-TYPE SECONDARY BATTERY

CROSS-REFERENCE TO RELATED APPLICATION

This application is a continuation of International Application No. PCT/KR2012/008402 filed on Oct. 15, 2012, which claims priority under 35 USC 119(a) to Korean Patent Application Nos. 10-2011-0105218 and 10-2011-0105219 filed in the Republic of Korea on Oct. 14, 2011, and Korean Patent Application No. 10-2012-0114438 filed in the Republic of Korea on Oct. 15, 2012, the disclosures thereof are incorporated herein by reference.

TECHNICAL FIELD

The present invention relates to a cable-type secondary battery, which can freely change in shape, and more particularly to a cable-type secondary battery comprising an outer current collector in the form of an open structure.

BACKGROUND ART

Secondary batteries are devices capable of storing energy in chemical form and of converting into electrical energy to generate electricity when needed. The secondary batteries are also referred to as rechargeable batteries because they can be recharged repeatedly. Common secondary batteries include lead accumulators, NiCd batteries, NiMH accumulators, Li-ion batteries, Li-ion polymer batteries, and the like. When compared with disposable primary batteries, not only are the secondary batteries more economically efficient, they are also more environmentally friendly.

Secondary batteries are currently used in applications requiring low electric power, for example, equipment to start vehicles, mobile devices, tools, uninterruptible power supplies, and the like. Recently, as the development of wireless communication technologies has been leading to the popularization of mobile devices and even to the mobilization of many kinds of conventional devices, the demand for secondary batteries has been dramatically increasing. Secondary batteries are also used in environmentally friendly next-generation vehicles such as hybrid vehicles and electric vehicles to reduce the costs and weight and to increase the service life of the vehicles.

Generally, secondary batteries have a cylindrical, prismatic, or pouch shape. This is associated with a fabrication process of the secondary batteries in which an electrode assembly composed of an anode, a cathode, and a separator is mounted in a cylindrical or prismatic metal casing or a pouch-shaped casing of an aluminum laminate sheet, and in which the casing is filled with electrolyte. Because a predetermined mounting space for the electrode assembly is necessary in this process, the cylindrical, prismatic or pouch shape of the secondary batteries is a limitation in developing various shapes of mobile devices. Accordingly, there is a need for secondary batteries of a new structure that are easily adaptable in shape.

To fulfill this need, suggestions have been made to develop linear batteries having a very high ratio of length to cross-sectional diameter. Korean Patent No. 0804411 discloses a linear battery consisting of a plurality of cathodes and anodes and separators interposed between each cathode and each anode. Korean Patent No. 0742739 discloses a thread-type flexible battery consisting of cathode threads and anode threads. However, these batteries have insufficient flexibility. Also, if the outer current collector of these batteries is deformed by external force, a short circuit may occur due to the contact between the outer and inner current collectors.

DISCLOSURE

Technical Problem

The present invention is designed to solve the problems of the prior art, and therefore it is an object of the present invention to provide a secondary battery having a new linear structure, which can easily change in shape, maintain excellent stability and performances as a secondary battery, and prevent a short circuit due to the deformation of an outer current collector.

Technical Solution

In order to achieve the objects, in accordance with one aspect of the present invention, there is provided a cable-type secondary battery having a horizontal cross section of a predetermined shape and extending longitudinally, comprising: an inner electrode having an inner current collector and an inner electrode active material layer surrounding the outer surface of the inner current collector; a separation layer surrounding the outer surface of the inner electrode to prevent a short circuit between electrodes; and an outer electrode surrounding the outer surface of the separation layer, and having an outer electrode active material layer and an open-structured outer current collector.

In the present invention, the open-structured outer current collector may be in the form of a wound wire, a wound sheet or a mesh.

In the outer electrode, the open-structured outer current collector may be formed to surround the outer surface of the separation layer, and the outer electrode active material layer may be formed to surround the outer surface of the open-structured outer current collector; the outer electrode active material layer may be formed to surround the outer surface of the separation layer, and the open-structured outer current collector may be formed to surround the outer surface of the outer electrode active material layer; the open-structured outer current collector may be formed to surround the outer surface of the separation layer, and the outer electrode active material layer may be formed to surround the outer surface of the open-structured outer current collector and to come into contact with the separation layer; or the outer electrode active material layer may be formed to surround the outer surface of the separation layer, and the open-structured outer current collector may be formed to be included inside the outer electrode active material layer by being covered therein and to surround the outer surface of the separation layer with spacing apart therefrom.

The inner current collector may be made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer.

The conductive material used in the inner current collector may be selected from the group consisting of polyacetylene, polyaniline, polypyrrole, polythiophene, polysulfurnitride, indium tin oxide (ITO), silver, palladium, nickel, and a mixture thereof.

The conductive polymer used in the inner current collector may be selected from the group consisting of polyacetylene, polyaniline, polypyrrole, polythiophene, polysulfurnitride, and a mixture thereof.

The open-structured outer current collector may be made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; a conductive polymer; a metal paste comprising metal powders of Ni, Al, Au, Ag, Al, Pd/Ag, Cr, Ta, Cu, Ba or ITO; or a carbon paste comprising carbon powders of graphite, carbon black or carbon nanotube.

The conductive material used in the outer current collector may be selected from the group consisting of polyacetylene, polyaniline, polypyrrole, polythiophene, polysulfurnitride, indium tin oxide (ITO), silver, palladium, nickel, and a mixture thereof.

The conductive polymer used in the outer current collector may be selected from the group consisting of polyacetylene, polyaniline, polypyrrole, polythiophene, polysulfurnitride, and a mixture thereof.

In the present invention, the inner electrode may be an anode and the outer electrode may be a cathode, or the inner electrode may be a cathode and the outer electrode may be an anode.

When the inner electrode of the present invention is an anode and the outer electrode is a cathode, the inner electrode active material layer may comprise an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; oxides (MeOx) of the metals; a complex of the metals and carbon; and a mixture thereof, and the outer electrode active material layer may comprise an active material selected from the group consisting of LiCoO$_2$, LiNiO$_2$, LiMn$_2$O$_4$, LiCoPO$_4$, LiFePO$_4$, LiNiMnCoO$_2$, LiNi$_{1-x-y-z}$Co$_x$M1$_y$M2$_z$O$_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \le x < 0.5$, $0 \le y < 0.5$, $0 \le z < 0.5$, and $x+y+z \le 1$), and a mixture thereof.

Alternatively, when the inner electrode is a cathode and the outer electrode is an anode, the inner electrode active material layer may comprise an active material selected from the group consisting of LiCoO$_2$, LiNiO$_2$, LiMn$_2$O$_4$, LiCoPO$_4$, LiFePO$_4$, LiNiMnCoO$_2$, LiNi$_{1-x-y-z}$Co$_x$M1$_y$M2$_z$O$_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \le x < 0.5$, $0 \le y < 0.5$, $0 \le z < 0.5$, and $x+y+z \le 1$), and a mixture thereof, and the outer electrode active material layer may comprise an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; oxides (MeOx) of the metals; a complex of the metals and carbon; and a mixture thereof.

In the present invention, the separation layer may be an electrolyte layer or a separator.

The electrolyte layer may comprise an electrolyte selected from a gel polymer electrolyte using PEO, PVdF, PVdF-HFP, PMMA, PAN, or PVAc; and a solid electrolyte using PEO, polypropylene oxide (PPO), polyether imine (PEI), polyethylene sulphide (PES), or polyvinyl acetate (PVAc).

The electrolyte layer may further comprise a lithium salt.

The lithium salt may be selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, lithium tetraphenylborate, and a mixture thereof.

The separator may be a porous substrate made of a polyolefin-based polymer selected from the group consisting of ethylene homopolymers, propylene homopolymers, ethylene-butene copolymers, ethylene-hexene copolymers, and ethylene-methacrylate copolymers; a porous substrate made of a polymer selected from the group consisting of polyesters, polyacetals, polyamides, polycarbonates, polyamides, polyether ether ketones, polyether sulfones, polyphenylene oxides, polyphenylene sulfides and polyethylene naphthalenes; or a porous substrate made of a mixture of inorganic particles and a binder polymer.

Further, in accordance with another aspect of the present invention, there is provided a cable-type secondary battery having a horizontal cross section of a predetermined shape and extending longitudinally, comprising: an inner electrode having two or more first electrodes arranged in parallel to each other, each first electrode comprising an inner current collector extended in the longitudinal direction, and an inner electrode active material layer formed on the surface of the inner current collector; a separation layer surrounding the outer surface of the inner electrodes to prevent a short circuit between electrodes; and an outer electrode surrounding the outer surface of the separation layer and having an outer electrode active material layer and an open-structured outer current collector.

Advantageous Effects

In accordance with the present invention, an open-structured outer current collector having good flexibility and a certain degree of elasticity is used in a cable-type battery to improve the flexibility of the cable-type battery. Also, the open-structured outer current collector of the present invention is less subjected to excessive deformation such as bending or severe folding, due to its structural characteristic, even if excessive external force is applied to the cable-type battery, thereby preventing a short circuit due to the contact with the inner current collector and the release of an active material. Further, the open-structured outer current collector can be present inside the outer electrode active material layer to improve an electric contact between the outer current collector and the outer electrode active material layer, thereby contributing to the enhancement of battery characteristics.

DESCRIPTION OF THE DRAWINGS

The accompanying drawings illustrate preferred embodiments of the present invention and, together with the foregoing disclosure, serve to provide further understanding of the technical spirit of the present invention. However, the present invention is not to be construed as being limited to the drawings.

BEST MODE

Hereinafter, the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

FIGS. 1 to 4 schematically show a cable-type secondary battery having one inner electrode and an open-structured outer current collector in accordance with the embodiments of the present invention. However, the configurations illustrated in the drawings and the embodiments are just preferable examples for the purpose of illustrations only, not intended to limit the scope of the disclosure, so it should be understood that other equivalents and modifications could be made thereto without departing from the spirit and scope of the disclosure.

Referring to FIGS. 1 to 4, a cable-type secondary battery 100, 200, which has a horizontal cross section of a predetermined shape and extends longitudinally, comprises an inner electrode having an inner current collector 110, 210 and an inner electrode active material layer 120, 220 surrounding the outer surface of the inner current collector 110, 210; a separation layer 130, 230 surrounding the outer surface of the inner electrode to prevent a short circuit between electrodes; and an outer electrode surrounding the outer surface of the separation layer, and having an outer electrode active material layer 140, 240 and an open-structured outer current collector 150, 250. The term 'a predetermined shape' used herein is not limited to any particular shape, and refers to any shape that does not damage the nature of the present invention. The cable-type secondary battery of the present invention has a horizontal cross section of a predetermined shape, a linear structure, which extends in the longitudinal direction, and flexibility, so it can freely change in shape.

Also, the term 'open-structured' used herein means that a structure has an open boundary surface through which a substance may be transferred freely from the inside of the structure to the outside thereof. The open-structured outer current collector may be in the form of a wound wire, a wound sheet or a mesh, but is not limited thereto.

The inner electrode of the present invention consists of the inner current collector 110, 210 and the inner electrode active material layer 120, 220 surrounding the outer surface of the inner current collector 110, 210. Such an inner electrode is surrounded with the separation layer 130, 230 for preventing a short circuit between electrodes on the outer surface thereof.

On the outer surface of the separation layer 130, 230, an outer electrode is formed.

In the present invention, the outer electrode may be formed in various embodiments depending on the disposition of the outer electrode active material layer and the open-structured outer current collector, which come into contact with the separation layer.

Figure 1:
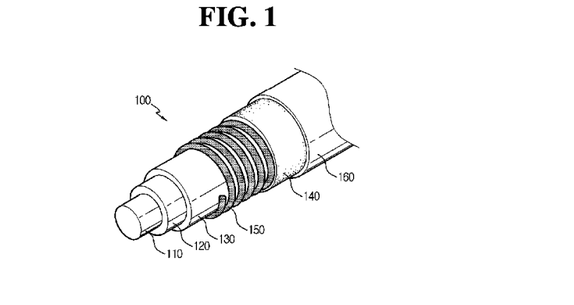
FIG. 1 shows a cable-type secondary battery having one inner electrode and a wound wire-type outer current collector in accordance with one embodiment of the present invention.
Figure 2:
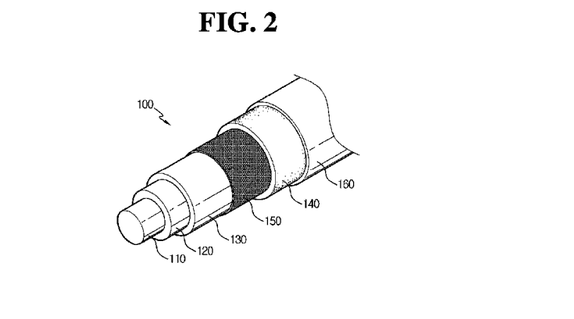
FIG. 2 shows a cable-type secondary battery having one inner electrode and a mesh-type outer current collector in accordance with one embodiment of the present invention.

According to a first embodiment of the present invention, as shown in FIGS. 1 and 2, the outer electrode has the open-structured outer current collector 150 surrounding the outer surface of the separation layer 130 and the outer electrode active material layer 140 surrounding the outer surface of the open-structured outer current collector 150.

For example, referring to FIG. 1 showing a cable-type secondary battery having an open structured outer current collector in the form of a wound wire, a wire-type and open structured outer current collector 150 is wound on the outer surface of the separation layer 130. In the case of wire-type conventional current collectors, its flexibility is good, but it is difficult to obtain a desired degree of conductivity. However, in accordance with the present invention, when the wire-type conventional current collector is wound on the outer surface of an electrode assembly, a contact area between an active material layer and the electrode assembly becomes sufficient, and thus, a certain degree of battery performance can be obtained. Particularly, the outer electrode active material layer 140 of the present invention is formed, for example, by coating a slurry of an active material on the outer surface of the open-structured outer current collector in the form of a wound wire. From this, the outer electrode active material layer 140 comes into contact with the separation layer, and the open-structured outer current collector in the form of a wound wire is configured to be included inside the outer electrode active material layer 140 to improve electric contact between the current collector and the active material, thereby contributing to the enhancement of battery characteristics.

Such an open-structured outer current collector in the form of a wound wire has a certain degree of elasticity due to its structural characteristic, and improves the flexibility of the whole cable-type secondary battery. Also, the open-structured outer current collector of the present invention is less subjected to excessive deformation such as bending or severe folding, due to its structural characteristic, even if excessive external force is applied to the cable-type battery, thereby preventing a short circuit due to the contact with the inner current collector.

Generally, an electrode active material layer comprises an electrode active material, a binder and a conductive material, and is combined with a current collector to configure an electrode. If the electrode is deformed by bending or severe folding due to external force, the electrode active material may be released. The release of the electrode active material deteriorates the performance and capacity of batteries. However, in accordance with the present invention, since the wound wire-form outer current collector has elasticity, it can disperse the applied force when such a deformation occurs by the external force, which causes only a slight deformation of the active material layer, thereby preventing the release of the active material.

As the open-structured outer current collector, a wound sheet form or a mesh form may also exhibit the same effect as the above-mentioned wound wire form.

Figure 3:
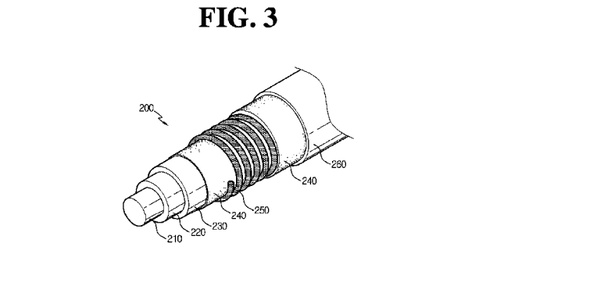
FIG. 3 shows a cable-type secondary battery having one inner electrode and a wound wire-type outer current collector covered inside an outer electrode active material layer in accordance with one embodiment of the present invention.
Figure 4:
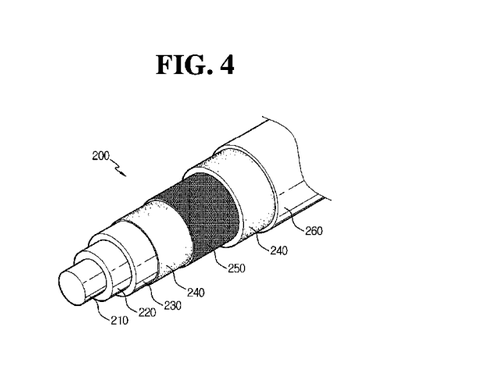
FIG. 4 shows a cable-type secondary battery having one inner electrode and a mesh-type outer current collector covered inside an outer electrode active material layer in accordance with one embodiment of the present invention.

According to a second embodiment of the present invention, as shown in FIGS. 3 and 4, the outer electrode has the outer electrode active material layer 240 surrounding the outer surface of the separation layer 230, and the open-structured outer current collector 250 covered inside the outer electrode active material layer and surrounding the outer surface of the separation layer 230 with spacing apart therefrom. The open-structured outer current collector 250 is covered in the outer electrode active material layer 240 to more improve electric contact, thereby contributing to the enhancement of battery characteristics.

According to other embodiments of the present invention, the outer electrode of the cable-type secondary battery may be formed in a structure having the outer electrode active material layer formed to surround the outer surface of the separation layer, and the open-structured outer current collector formed to surround the outer surface of the outer electrode active material layer; or a structure having the open-structured outer current collector formed to surround the outer surface of the separation layer, and the outer electrode active material layer formed to surround the outer surface of the open-structured outer current collector and to come into contact with the separation layer.

Meanwhile, the inner current collector is preferably made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer. The outer current collector is preferably made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; a conductive polymer; a metal paste comprising metal powders of Ni, Al, Au, Ag, Al, Pd/Ag, Cr, Ta, Cu, Ba or ITO; or a carbon paste comprising carbon powders of graphite, carbon black or carbon nanotube.

Such a current collector serves to collect electrons generated by electrochemical reaction of the active material or to supply electrons required for the electrochemical reaction. In general, the current collector is made of a metal such as copper or aluminum. Especially, when the current collector is made of a non-conductive polymer treated with a conductive material on the surface thereof or a conductive polymer, the current collector has a relatively higher flexibility than the current collector made of a metal such as copper or aluminum. Also, a polymer current collector may be used instead of the metal current collector to reduce the weight of the battery.

The conductive material may include polyacetylene, polyaniline, polypyrrole, polythiophene, polysulfurnitride, indium tin oxide (ITO), copper, silver, palladium, nickel, etc. The conductive polymer may include polyacetylene, polyaniline, polypyrrole, polythiophene, polysulfurnitride, etc. However, the non-conductive polymer used for the current collector is not particularly limited to its kinds.

The inner electrode may be an anode and the outer electrode may be a cathode. Alternatively, the inner electrode may be a cathode and the outer electrode may be an anode.

In the present invention, the electrode active material layer allows ions to move through the current collector, and the movement of ions is caused by the interaction of ions such as intercalation/deintercalation of ions into and from the electrolyte layer.

Such an electrode active material layer may be divided into an anode active material layer and a cathode active material layer.

Specifically, when the inner electrode is an anode and the outer electrode is a cathode, the inner electrode active material layer becomes an anode active material layer and may be made of an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; oxides (MeOx) of the metals; a complex of the metals and carbon; and a mixture thereof, and the outer electrode active material layer becomes a cathode active material layer and may be made of an active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and a mixture thereof.

Alternatively, when the inner electrode is a cathode and the outer electrode is an anode, the inner electrode active material layer becomes a cathode active material layer and the outer electrode active material layer becomes an anode active material layer.

The separation layer of the present invention may be an electrolyte layer or a separator.

The electrolyte layer serving as an ion channel may be made of a gel-type polymer electrolyte using PEO, PVdF, PVdF-HFP, PMMA, PAN or PVAC, or a solid electrolyte using PEO, polypropylene oxide (PPO), polyethylene imine (PEI), polyethylene sulfide (PES) or polyvinyl acetate (PVAc). The matrix of the solid electrolyte is preferably formed using a polymer or a ceramic glass as the backbone. In the case of typical polymer electrolytes, the ions move very slowly in terms of reaction rate, even when the ionic conductivity is satisfied. Thus, the gel-type polymer electrolyte which facilitates the movement of ions is preferably used compared to the solid electrolyte. The gel-type polymer electrolyte has poor mechanical properties and thus may comprise a porous support or a cross-linked polymer to improve poor mechanical properties. The electrolyte layer of the present invention can serve as a separator, and thus an additional separator may be omitted.

The electrolyte layer of the present invention may further comprise a lithium salt. The lithium salt can improve an ionic conductivity and response time. Non-limiting examples of the lithium salt may include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, and lithium tetraphenylborate.

Examples of the separator may include, but is not limited to, a porous substrate made of a polyolefin-based polymer selected from the group consisting of ethylene homopolymers, propylene homopolymers, ethylene-butene copolymers, ethylene-hexene copolymers, and ethylene-methacrylate copolymers; a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalenes; or a porous substrate made of a mixture of inorganic particles and a binder polymer.

Also, the cable-type secondary battery of the present invention has a protection coating. The protection coating is an insulator and is formed to surround the outer current collector, thereby protecting the electrodes against moisture in the air and external impacts. The protection coating may be made of conventional polymer resins, for example, PVC, HDPE or epoxy resins.

Hereinafter, a cable-type secondary battery according to one embodiment of the present invention and the manufacture thereof will be briefly explained with reference to FIG. 1.

The cable-type secondary battery 100 according to one embodiment of the present invention comprises the inner current collector 110 having a horizontal cross section of a predetermined shape and extending longitudinally; the inner electrode active material layer 120 surrounding the outer surface of the inner current collector 110; the separation layer 130 surrounding the outer surface of the inner electrode active material layer 120 and acting as an electrolyte layer being an ion channel; the open-structured outer current collector 150 wound in the form of a wire on the outer surface of the separation layer 130; and the outer electrode active material layer 140 surrounding the outer surface of the open-structured outer current collector 150.

First, the inner current collector 110 is provided in the form of a wire, and an inner electrode active material layer is formed on the surface of the inner current collector by way of coating. The coating may be carried out by various conventional methods, for example, by an electroplating process or an anodic oxidation process. Also, in order to maintain constant intervals, an electrode slurry containing an active material may be discontinuously applied by way of an extrusion-coating using an extruder. In addition, the electrode slurry containing an active material may be applied by way of dip coating or extrusion-coating using an extruder.

Subsequently, the separation layer 130 which is an electrolyte layer is formed to surround the inner electrode active material layer 120. The method for forming the separation layer 130, an electrolyte layer, is not particularly limited, but an extrusion coating method is preferably used to facilitate the manufacturing process due to the nature of the linear cable-type secondary battery.

On the outer surface of the separation layer 130 formed by the coating of an electrolyte, the wire-type outer current collector is wound, for example, by using a winding machine, but the winding method is not particularly limited. Then, the outer electrode active material layer 140 is formed on the wire-type and open-structured outer current collector 150 by way of coating. The coating method of the inner electrode active material layer 120 may be identically applied to the outer electrode active material layer 140. The outer electrode active material layer 140 may be formed to surround the wire-type and open-structured outer current collector 150 and to come into contact with the separation layer 130.

Finally, the protection coating 160 is formed to surround the outer surface of the outer electrode active material layer 140. The protection coating 160 is an insulator and is formed on the outermost surface for the purpose of protecting the electrodes against moisture in the air and external impacts. As the protection coating 160, conventional polymer resins, for example, PVC, HDPE and epoxy resins may be used.

Hereinafter, another embodiment of the present invention will be explained with reference to FIGS. 5 and 6.

Figure 5:
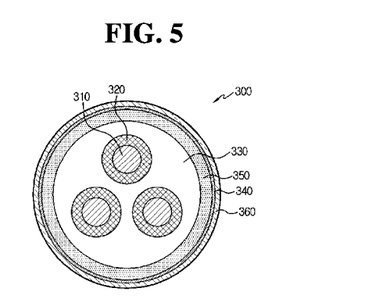
FIG. 5 is a cross-sectional view of a cable-type secondary battery having multiple inner electrodes in accordance with one embodiment of the present invention.
Figure 6:
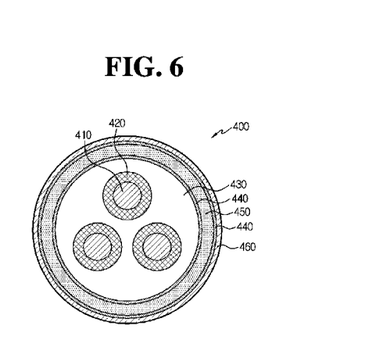
FIG. 6 is a cross-sectional view of a cable-type secondary battery having multiple inner electrodes and an outer current collector covered inside an outer electrode active material layer in accordance with one embodiment of the present invention.

Referring to FIGS. 5 and 6, the cable-type secondary battery 300, 400 of the present invention comprises two or more inner electrodes arranged parallel to each other, each inner electrode having the inner current collector 310, 410 extending longitudinally; the inner electrode active material layer 320, 420 surrounding the outer surface of the inner current collector 310, 410; the separation layer 330, 430 surrounding the outer surface of the inner electrode to prevent a short circuit between electrodes; an outer electrode surrounding the outer surface of the separation layer 330, 430, and having the outer electrode active material layer 340, 440 and the open-structured outer current collector 350, 450.

Such cable-type secondary batteries 300 and 400 have the inner electrode consisting of multiple electrodes, thereby allowing controlling the balance between a cathode and anode and preventing a short circuit.

In particular, as shown in FIG. 6, the outer electrode has the outer electrode active material layer surrounding the outer surface of the separation layer, and the open-structured outer current collector covered inside the outer electrode active material layer and surrounding the outer surface of the separation layer with spacing apart therefrom, thereby leading to a more improved electric contact, and eventually contributing to the enhancement of battery characteristics.

What is claimed is:

1. A cable-type secondary battery comprising:
   an inner electrode having an inner current collector and an inner electrode active material layer surrounding an outer surface of the inner current collector;
   a separation layer surrounding an outer surface of the inner electrode to prevent a short circuit between electrodes; and
   an outer electrode surrounding an outer surface of the separation layer and having an outer electrode active material layer and an open-structured outer current collector,
   wherein the open-structured outer current collector is in the form of a helically wound wire or a wound sheet.

2. The cable-type secondary battery according to claim 1, wherein in the outer electrode,
   the open-structured outer current collector is formed to surround the outer surface of the separation layer, and the outer electrode active material layer is formed to surround an outer surface of the open-structured outer current collector;
   the outer electrode active material layer is formed to surround the outer surface of the separation layer, and the open-structured outer current collector is formed to surround an outer surface of the outer electrode active material layer;
   the open-structured outer current collector is formed to surround the outer surface of the separation layer, and the outer electrode active material layer is formed to surround the outer surface of the open-structured outer current collector and to come into contact with the separation layer; or
   the outer electrode active material layer is formed to surround the outer surface of the separation layer, and the open-structured outer current collector is formed to be included inside the outer electrode active material layer by being covered therein and to surround the outer surface of the separation layer with spacing apart therefrom.

3. The cable-type secondary battery according to claim 1, wherein the inner current collector is made of stainless steel, aluminum, nickel, titanium, sintered carbon, or copper; stainless steel treated with carbon, nickel, titanium or silver on a surface thereof; an aluminum-cadmium alloy; a non-conductive polymer treated with a conductive material on a surface thereof; or a conductive polymer.

4. The cable-type secondary battery according to claim 3, wherein the conductive material is selected from the group consisting of polyacetylene, polyaniline, polypyrrole, polythiophene, polysulfurnitride, indium tin oxide (ITO), silver, palladium, nickel, and a mixture thereof.

5. The cable-type secondary battery according to claim 3, wherein the conductive polymer is selected from the group consisting of polyacetylene, polyaniline, polypyrrole, polythiophene, polysulfurnitride, and a mixture thereof.

6. The cable-type secondary battery according to claim 1, wherein the open-structured outer current collector is made of stainless steel, aluminum, nickel, titanium, sintered carbon, or copper; stainless steel treated with carbon, nickel, titanium or silver on a surface thereof; an aluminum-cadmium alloy; a non-conductive polymer treated with a conductive material on a surface thereof; a conductive polymer; a metal paste comprising metal powders of Ni, Al, Au, Ag, Al, Pd/Ag, Cr, Ta, Cu, Ba or ITO; or a carbon paste comprising carbon powders of graphite, carbon black or carbon nanotube.

7. The cable-type secondary battery according to claim 6, wherein the conductive material is selected from the group consisting of polyacetylene, polyaniline, polypyrrole, polythiophene, polysulfurnitride, indium tin oxide (ITO), silver, palladium, nickel, and a mixture thereof.

8. The cable-type secondary battery according to claim 6, wherein the conductive polymer is selected from the group consisting of polyacetylene, polyaniline, polypyrrole, polythiophene, polysulfurnitride, and a mixture thereof.

9. The cable-type secondary battery according to claim 1, wherein the inner electrode is an anode and the outer electrode is a cathode, or the inner electrode is a cathode and the outer electrode is an anode.

10. The cable-type secondary battery according to claim 1, wherein when the inner electrode is an anode and the outer electrode is a cathode,
the inner electrode active material layer comprises an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; oxides (MeOx) of the metals; a complex of the metals and carbon; and a mixture thereof, and
the outer electrode active material layer comprises an active material selected from the group consisting of LiCoO2, LiNiO2, LiMn2O4, LiCoPO4, LiFePO4, LiNiMnCoO2, LiNi1-x-y-zCoxM1yM2zO2 (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which 0≤x< 0.5, 0≤y< 0.5, 0≤z<0.5, and x+y+z≤1), and a mixture thereof.

11. The cable-type secondary battery according to claim 1, wherein when the inner electrode is a cathode and the outer electrode is an anode,
the inner electrode active material layer comprises an active material selected from the group consisting of LiCoO2, LiNiO2, LiMn2O4, LiCoPO4, LiFePO4, LiNiMnCoO2, LiNi1-x-y-zCoxM1yM2zO2 (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which 0≤x<0.5, 0≤y<0.5, 0≤z<0.5, and x+y+z≤1), and a mixture thereof, and
the outer electrode active material layer comprises an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; oxides (MeOx) of the metals; a complex of the metals and carbon; and a mixture thereof.

12. The cable-type secondary battery according to claim 1, wherein the separation layer is an electrolyte layer or a separator.

13. The cable-type secondary battery according to claim 12, wherein the electrolyte layer comprises an electrolyte selected from a gel polymer electrolyte using PEO, PVdF, PVdF-HFP, PMMA, PAN, or PVAc; and a solid electrolyte using PEO, polypropylene oxide (PPO), polyether imine (PEI), polyethylene sulphide (PES), or polyvinyl acetate (PVAc).

14. The cable-type secondary battery according to claim 13, wherein the electrolyte layer further comprises a lithium salt.

15. The cable-type secondary battery according to claim 14, wherein the lithium salt is selected from the group consisting of LiCl, LiBr, LiI, LiClO4, LiBF4, LiB10Cl10, LiPF6, LiCF3SO3, LiCF3CO2, LiAsF6, LiSbF6, LiAlCl4, CH3SO3Li, CF3SO3Li, (CF3SO2)2NLi, lithium chloroborate, lower aliphatic lithium carbonate, lithium tetraphenylborate, and a mixture thereof.

16. The cable-type secondary battery according to claim 12, wherein the separator is a porous substrate made of a polyolefin-based polymer selected from the group consisting of ethylene homopolymers, propylene homopolymers, ethylene-butene copolymers, ethylene-hexene copolymers, and ethylene-methacrylate copolymers; a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalenes; or a porous substrate made of a mixture of inorganic particles and a binder polymer.

17. A cable-type secondary battery comprising:
an inner electrode having two or more first electrodes arranged in parallel to each other, each first electrode comprising an inner current collector extended in a longitudinal direction, and an inner electrode active material layer formed on a surface of the inner current collector;
a separation layer surrounding an outer surface of the inner electrode to prevent a short circuit between electrodes; and
an outer electrode surrounding an outer surface of the separation layer and having an outer electrode active material layer and an open-structured outer current collector,
wherein the open-structured outer current collector is in the form of a helically wound wire or a wound sheet.

18. The cable-type secondary battery according to claim 17, wherein in the outer electrode,
the open-structured outer current collector is formed to surround the outer surface of the separation layer, and the outer electrode active material layer is formed to surround an outer surface of the open-structured outer current collector;

the outer electrode active material layer is formed to surround the outer surface of the separation layer, and the open-structured outer current collector is formed to surround an outer surface of the outer electrode active material layer;

the open-structured outer current collector is formed to surround the outer surface of the separation layer, and the outer electrode active material layer is formed to surround the outer surface of the open-structured outer current collector and to come into contact with the separation layer; or the outer electrode active material layer is formed to surround the outer surface of the separation layer, and the open-structured outer current collector is formed to be included inside the outer electrode active material layer by being covered therein and to surround the outer surface of the separation layer with spacing apart therefrom.

* * * * *